United States Patent
Ko et al.

(10) Patent No.: US 8,565,211 B2
(45) Date of Patent: Oct. 22, 2013

(54) APPARATUS AND METHOD FOR DATA TRANSMISSION IN SC-FDMA SYSTEM WITH MULTIPLE ANTENNAS

(75) Inventors: Hyun Soo Ko, Gyeongki-do (KR); Seung Hee Han, Gyeongki-do (KR); Jae Hoon Chung, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/001,219

(22) PCT Filed: Jun. 26, 2009

(86) PCT No.: PCT/KR2009/003487
§ 371 (c)(1),
(2), (4) Date: Mar. 3, 2011

(87) PCT Pub. No.: WO2009/157741
PCT Pub. Date: Dec. 30, 2009

(65) Prior Publication Data
US 2011/0149944 A1 Jun. 23, 2011

Related U.S. Application Data

(60) Provisional application No. 61/075,754, filed on Jun. 26, 2008, provisional application No. 61/081,377, filed on Jul. 16, 2008, provisional application No. 61/087,975, filed on Aug. 11, 2008, provisional application No. 61/088,353, filed on Aug. 13, 2008, provisional application No. 61/155,899, filed on Feb. 26, 2009.

(30) Foreign Application Priority Data

Dec. 29, 2008 (KR) .......... 10-2008-0135991

(51) Int. Cl.
*H04B 7/208* (2006.01)
(52) U.S. Cl.
USPC .......................................... 370/344
(58) Field of Classification Search
USPC ................................ 370/254–340
See application file for complete search history.

(56) References Cited

U.S. PATENT DOCUMENTS

| 6,888,809 B1 | 5/2005 | Foschini et al. |
| 7,881,247 B2 | 2/2011 | Pan et al. |

(Continued)

FOREIGN PATENT DOCUMENTS

| KR | 10-2001-0076252 | 8/2001 |
| KR | 2005-0069802 | 7/2005 |

(Continued)

OTHER PUBLICATIONS

USPTO Office Action dated Mar. 20, 2013 in technologically related U.S. Appl. No. 13/000,706.

(Continued)

*Primary Examiner* — Ayaz Sheikh
*Assistant Examiner* — Debebe Asefa
(74) *Attorney, Agent, or Firm* — Morgan, Lewis & Bockius LLP

(57) ABSTRACT

According to an aspect of the present invention, an apparatus for data transmission is provided. The apparatus includes a data processing unit generating a data symbol by performing channel coding and constellation mapping on an information bit, a single carrier-frequency division multiple access (SC-FDMA) modulator generating an SC-FDMA symbol by performing discrete Fourier transform (DFT) on the data symbol, by mapping the DFT performed-data symbol to subcarriers, and by performing inverse fast Fourier transform (IFFT) on the subcarrier mapped-DFT performed-data symbol, and a plurality of transmit antennas transmitting the SC-FDMA symbol. A single carrier-frequency division multiple access (SC-FDMA) system can effectively use frequency switched transmit diversity (FSTD) to reduce a peak-to-average power ratio (PAPR) and to maintain a single-carrier property.

4 Claims, 14 Drawing Sheets

(56) References Cited

U.S. PATENT DOCUMENTS

| | | | |
|---|---|---|---|
| 8,068,555 | B2 | 11/2011 | Jongren et al. |
| 8,095,143 | B2 | 1/2012 | Amirijoo et al. |
| 2003/0139139 | A1 | 7/2003 | Onggosanuisi et al. |
| 2004/0077378 | A1 | 4/2004 | Kim et al. |
| 2005/0265280 | A1 | 12/2005 | Roh et al. |
| 2006/0067421 | A1 | 3/2006 | Walton et al. |
| 2007/0004465 | A1 | 1/2007 | Papasakellariou et al. |
| 2007/0115795 | A1 | 5/2007 | Gore et al. |
| 2007/0189151 | A1 | 8/2007 | Pan et al. |
| 2007/0211822 | A1 | 9/2007 | Olesen et al. |
| 2008/0032746 | A1 | 2/2008 | Olesen et al. |
| 2008/0056117 | A1 | 3/2008 | Muharemovic et al. |
| 2008/0080472 | A1 | 4/2008 | Bertrand et al. |
| 2008/0080637 | A1 | 4/2008 | Khan et al. |
| 2008/0089441 | A1 | 4/2008 | Hwang et al. |
| 2008/0095252 | A1* | 4/2008 | Kim et al. ............ 375/260 |
| 2008/0117999 | A1 | 5/2008 | Kadous et al. |
| 2008/0165891 | A1* | 7/2008 | Budianu et al. ............ 375/299 |
| 2008/0279170 | A1 | 11/2008 | Malladi et al. |
| 2008/0307427 | A1 | 12/2008 | Pi et al. |
| 2009/0073922 | A1 | 3/2009 | Malladi et al. |
| 2009/0202016 | A1 | 8/2009 | Seong et al. |
| 2009/0262856 | A1 | 10/2009 | Onggosanusi et al. |
| 2009/0279447 | A1 | 11/2009 | Mehta et al. |
| 2010/0091903 | A1 | 4/2010 | Castelain et al. |
| 2010/0091919 | A1* | 4/2010 | Xu et al. ............ 375/346 |
| 2010/0111209 | A1* | 5/2010 | Frenger ............ 375/260 |
| 2011/0228728 | A1 | 9/2011 | Baligh et al. |

FOREIGN PATENT DOCUMENTS

| | | |
|---|---|---|
| KR | 2006-0048106 | 5/2006 |
| KR | 10-0698199 B | 3/2007 |
| KR | 10-0785806 B | 12/2007 |
| KR | 2008-0025260 | 3/2008 |
| KR | 10-0899735 B | 5/2009 |
| WO | 03/085876 | 10/2003 |

OTHER PUBLICATIONS

International Search Report from related technology PCT Application No. PCT/KR2009/003037.

C. Ciochina et al., "Single-Carrier Space-Frequency Block Coding Performance Evaluation", IEEE 66th Vehicular Technology Conference, 2007, pp. 715-719.

International Search Report from PCT/KR2009/003487.
International Search Report from PCT/KR2009/003466.
International Search Report from PCT/KR2009/003026.
International Search Report from PCT/KR2009/003012.
International Search Report from PCT/KR2009/003027.

Office Action dated Oct. 18, 2012 in related technology in U.S. Appl. No. 13/000,958.

Office Action dated Nov. 29, 2012 in related technology in U.S. Appl. No. 13/000,470.

Notice of Allowance dated Nov. 15, 2012 in related technology in U.S. Appl. No. 13/058,488.

U.S. Appl. No. 61/074,399.

USPTO Office Action dated Feb. 8, 2013 in technologically related U.S. Appl. No. 13/000,546.

* cited by examiner

APPARATUS AND METHOD FOR DATA TRANSMISSION IN SC-FDMA SYSTEM WITH MULTIPLE ANTENNAS

The present application is a national stage of PCT International Application No. PCT/KR2009/003487, filed Jun. 26, 2009, which claims the benefit of U.S. Provisional Application Nos. 61/075,754 (filed Jun. 26, 2008), 61/081,377 (filed Jul. 16, 2008), 61/087,975 (filed Aug. 11, 2008), 61/088,353 (filed Aug. 13, 2008), and 61/155,899 (filed Feb. 26, 2009) and claims the benefit of Korean Application No. 10-2008-0135991 (filed Dec. 29, 2008).

TECHNICAL FIELD

The present invention relates to wireless communications, and more particularly, to an apparatus and method for data transmission by using transmit diversity in a single carrier-frequency division multiple access (SC-FDMA) system with multiple antennas.

BACKGROUND ART

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data transfer rate of a wireless system, which results in motivating massive researches.

A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission over a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system. The MIMO system is also referred to as a multiple antenna system.

The MIMO system implements the diversity by using various schemes, for example, space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), generalized cyclic delay diversity (GCDD), selective virtual antenna permutation (S-VAP), etc.

Meanwhile, an orthogonal frequency division multiplexing (OFDM) system capable of reducing inter-symbol interference with a low complexity is taken into consideration as one of post-3rd generation wireless communication systems.

In the OFDM, a serially input data symbol is converted into N parallel data symbols, and is then transmitted by being carried on N orthogonal subcarriers. The subcarriers maintain orthogonality in a frequency dimension. An orthogonal frequency division multiple access (OFDMA) is a multiple access scheme for achieving multiple access by independently providing some of available subcarriers to each user in a system using the OFDM as a modulation scheme.

One of main problems of the OFDM/OFDMA system is that peak-to-average power ratio (PAPR) can be significantly large. The PAPR problem occurs when a peak amplitude of a Tx signal is significantly larger than an average amplitude. Further, the PAPR problem is caused by a fact that an OFDM symbol is an overlap of N sinusoidal signals on different subcarriers. The PAPR is particularly problematic in a UE sensitive to power consumption in association with battery capacity. The PAPR needs to be lowered to reduce power consumption.

Single carrier-frequency division multiple access (SC-FDMA) is proposed to decrease the PAPR. The SC-FDMA is single carrier-frequency division equalization (SC-FDE) combined with frequency division multiple access (FDMA). The SC-FDMA is similar to the OFDMA in that data is modulated and demodulated in a time domain and a frequency domain by using discrete Fourier transform (DFT). However, the SC-FDMA is advantageous in decreasing Tx power since a Tx signal has a low PAPR. In particular, regarding battery usage, the SC-FDMA is advantageous in case of uplink transmission where communication is achieved from a UE sensitive to Tx power to a base station (BS). When the UE transmits data to the BS, the transmitted data does not require a large bandwidth but a wide coverage is important for power concentration. The SC-FDMA system allows a small signal variation, and thus has a much wider coverage than other systems when using the same power amplifier.

Meanwhile, unlike the SC-FDMA system, clustered DFT-spread-OFDM (DFT-S-OFDM) allocates (or maps) M(<N) symbol streams among DFT-spread N symbol streams, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

However, it should be noticed that the SC-FDMA scheme is used when a single-carrier property is satisfied. A wireless communication system has to be able to provide transmit diversity for decreasing the PAPR by using the SC-FDMA scheme or the clustered DFT-S-OFDM scheme. There is a need for an apparatus and method for data transmission capable of providing the transmit diversity for decreasing the PAPR.

DISCLOSURE OF INVENTION

Technical Problem

The present invention provides an apparatus and method for data transmission capable of maintaining a single-carrier property while implementing transmit diversity by using frequency switched transmit diversity (FSTD).

Technical Solution

According to an aspect of the present invention, an apparatus for data transmission is provided. The apparatus includes a data processing unit generating a data symbol by performing channel coding and constellation mapping on an information bit, a single carrier-frequency division multiple access (SC-FDMA) modulator generating an SC-FDMA symbol by performing discrete Fourier transform (DFT) on the data symbol, by mapping the DFT performed-data symbol to subcarriers, and by performing inverse fast Fourier transform (IFFT) on the subcarrier mapped-DFT performed-data symbol, and a plurality of transmit antennas transmitting the SC-FDMA symbol. The SC-FDMA modulator allocates the subcarriers separately to each transmit antenna.

According to another aspect of the present invention, an apparatus for data transmission is provided. The apparatus includes a first discrete Fourier transform (DFT) unit generating a first frequency-domain symbol by performing DFT on some parts of a data symbol stream, a second DFT unit generating a second frequency-domain symbol by performing DFT on the remaining parts of the data symbol stream, a first subcarrier mapper mapping the first frequency-domain symbol to a plurality of first subcarriers, a second subcarrier mapper mapping the second frequency-domain symbol to a plurality of second subcarriers, a first inverse fast Fourier transform (IFFT) unit generating a first single carrier-frequency division multiple access (SC-FDMA) symbol by performing IFFT on an output of the first subcarrier mapper, a second IFFT unit generating a second SC-FDMA symbol by performing IFFT on an output of the second subcarrier mapper, and a plurality of transmit antennas transmitting the first and second SC-FDMA symbols.

According to yet another aspect of the present invention, a method for data transmission in a wireless communication system with multiple transmit antennas is provided. The method includes generating a data symbol stream by performing constellation mapping on a codeword, generating a frequency-domain symbol by performing discrete Fourier transform (DFT) on the data symbol stream, mapping the frequency-domain symbol to subcarriers separately allocated for each of the multiple transmit antennas, generating a transmit symbol by performing inverse fast Fourier transform (IFFT) on the subcarriers to which the frequency-domain symbol is mapped, and transmitting the transmit symbol by using the multiple transmit antennas.

Advantageous Effects

A single carrier-frequency division multiple access (SC-FDMA) system can effectively use frequency switched transmit diversity (FSTD) to reduce a peak-to-average power ratio (PAPR) and to maintain a single-carrier property.

MODE FOR THE INVENTION

Figure 1:
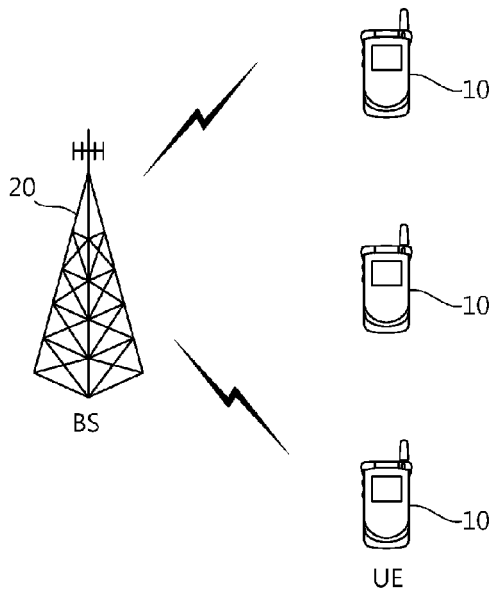
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

DL transmission and UL transmission may use different multiple access schemes. For example, DL transmission may use orthogonal frequency division multiple access (OFDMA), and UL transmission may use single carrier-frequency division multiple access (SC-FDMA) or clustered discrete Fourier transform spread orthogonal frequency division multiplexing (DFT-S-OFDM). A typical SC-FDMA scheme implies that DFT-spread symbol streams are allocated (or mapped) to consecutive subcarriers or equally-spaced subcarriers. The clustered DFT-S-OFDM allocates (or maps) M(<N) symbol streams among DFT-spread N symbol streams, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system may operate by using various multiple antenna transmission and reception schemes such as frequency switched transmit diversity (FSTD), space frequency block coding (SFBC), space time block coding (STBC), cyclic delay diversity (CDD), time switched transmit diversity (TSTD), etc. In case of a rank 2 or higher ranks, other schemes can be further used, for example, spatial multiplexing (SM), generalized cyclic delay diversity (GCDD), selective virtual antenna permutation (S-VAP), etc.

The FSTD is a scheme for obtaining a diversity gain by allocating subcarriers of different frequencies to signals transmitted to respective multiple antennas. The SFBC is a scheme for ensuring both a diversity gain and a multi-user scheduling gain in a corresponding dimension by effectively using selectivity of a space domain and a frequency domain. The STBC is a scheme using selectivity of the space domain and a time domain. The CDD is a scheme for obtaining a diversity gain by using a path delay between respective Tx antennas. The TSTD is a scheme in which the signals transmitted to the multiple antennas are divided in the frequency domain. The SM is a scheme for improving a transfer rate by transmitting different data to each antenna. The GCDD is a scheme using selectivity of the time domain and the frequency domain. The S-VAP is a scheme using a single precoding matrix, and includes a multi-codeword (MCW) S-VAP mixing multi-codewords to antennas in spatial diversity or spatial multiplexing and a single codeword (SCW) S-VAP using a single codeword.

In general, a multi-carrier system can allocate frequency resources by using the following schemes: (1) a scheme in which equally-spaced subcarriers are allocated in a full system bandwidth (i.e., interleaved allocation type); (2) a scheme in which locally contiguous subcarriers are allocated in the full system bandwidth (i.e., localized allocation type); and (3) a scheme in which subcarriers are allocated with an equal space or an arbitrary space in a set of locally contiguous subcarriers. The SC-FDMA system maps DFT-spread symbol streams to subcarriers by using one of the schemes (1) and (2). This is to maintain a single-carrier property. For example, the scheme (2) is determined to be used for UL transmission in the long term evolution (LTE) of 3rd generation partnership project (3GPP).

When the SC-FDMA system implements transmit diversity by using the FSTD, the single-carrier property is satisfied only when a frequency resource is allocated as follows. That is, within a frequency band allocated in a localized manner, the frequency resource (or subcarrier) needs to be allocated to each Tx antenna either in an interleaved manner or in a localized manner.

Figure 2:
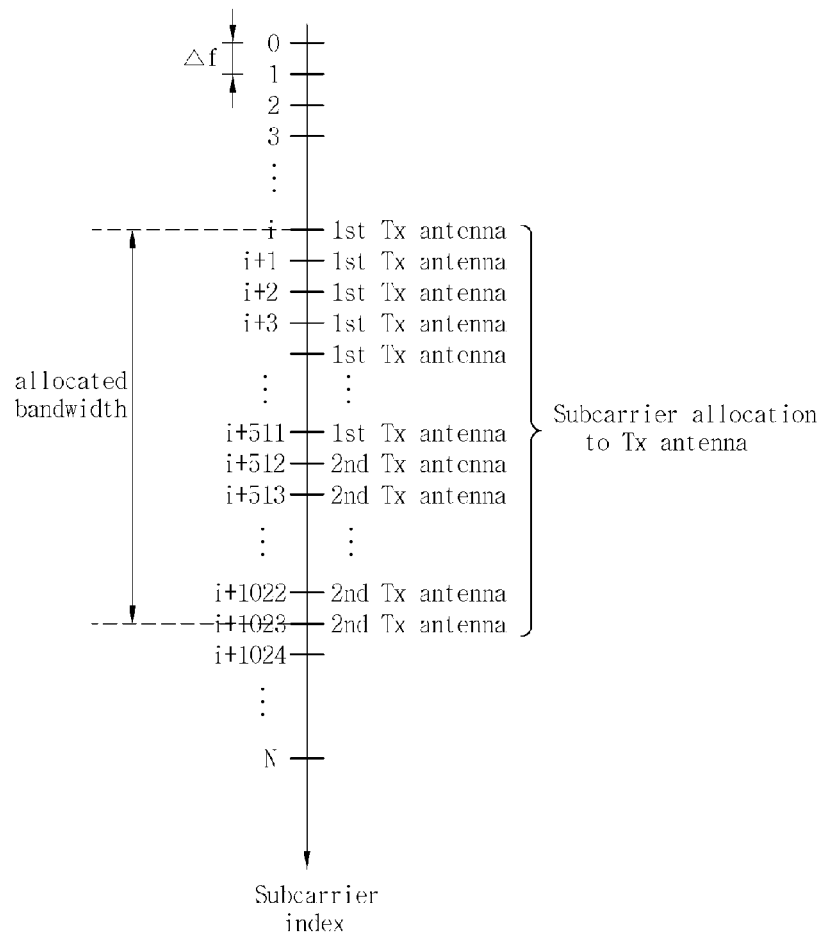
FIG. 2 shows an example in which subcarriers are allocated to each Tx antenna in a localized manner in an SC-FDMA system using FSTD.
Figure 3:
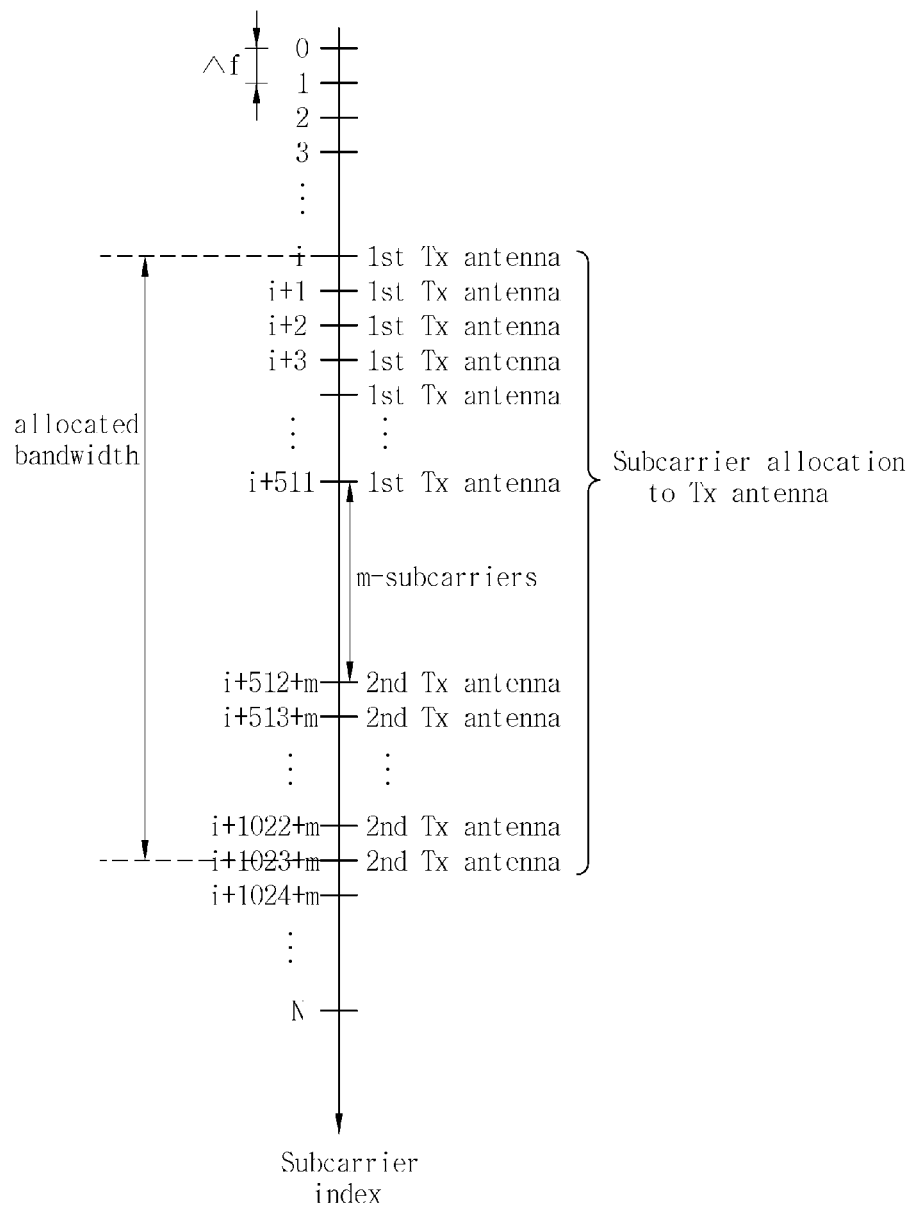
FIG. 3 shows an example in which subcarriers are allocated to each Tx antenna in a clustered manner in an SC-FDMA system using FSTD.

FIG. 2 shows an example in which subcarriers are allocated to each Tx antenna in a localized manner in an SC-FDMA system using FSTD. It is assumed herein that a DFT size is 1024.

Referring to FIG. 2, an allocated bandwidth corresponds to ith to (i+1023)th subcarriers allocated in whole system bands 0 to N. A subcarrier spacing $\Delta f$ between subcarriers may be 15 kHz or 7.5 kHz. At any transmission time, different subcarriers are allocated to a 1st Tx antenna and a 2nd Tx antenna. This is because the FSTD is used. In addition, subcarriers are allocated to each Tx antenna in a localized manner. For example, ith to (i+511)th subcarriers are allocated to the 1st Tx antenna, and (i+512)th to (i+1023)th subcarriers are allocated to the 2nd Tx antenna. That is, consecutive subcarriers in a certain region are allocated to any one Tx antenna, and consecutive subcarriers of another region are allocated to another Tx antenna. This is referred to as a localized type.

As a similar concept, there is a clustered type of allocation. In the clustered type, a group of consecutive subcarriers are separated with another group of consecutive subcarriers by m subcarriers. For instance, ith to (i+511)th subcarriers are allocated to the 1st Tx antenna, and (i+512+m)th to (i+1023+m)th subcarriers are allocated to the 2nd Tx antenna. That is, consecutive subcarriers in a certain region are allocated to any one Tx antenna, and consecutive subcarriers of another region are allocated to another Tx antenna. In this case, m subcarriers are between two consecutive subcarrier groups.

Meanwhile, to obtain a frequency diversity gain for each Tx antenna, an interleaving pattern can be changed on a SC-FDMA symbol basis, a slot basis or a subframe basis. For example, if a 1st SC-FDMA symbol is transmitted by allocating the ith to (i+511)th subcarriers to the 1st Tx antenna and by allocating the (i+512+m)th to (i+1023+m)th subcarriers to the 2nd Tx antenna, then a 2nd SC-FDMA symbol is transmitted by allocating the (i+512+m)th to (i+1023+m)th subcarriers to the 1st Tx antenna and by allocating the ith to (i+511)th subcarriers to the 2nd Tx antenna. If a resource block includes an SC-FDMA symbol to which demodulation reference signal (DMRS) is mapped, a mapping pattern can be determined by considering a position of the DMRS.

Figure 4:
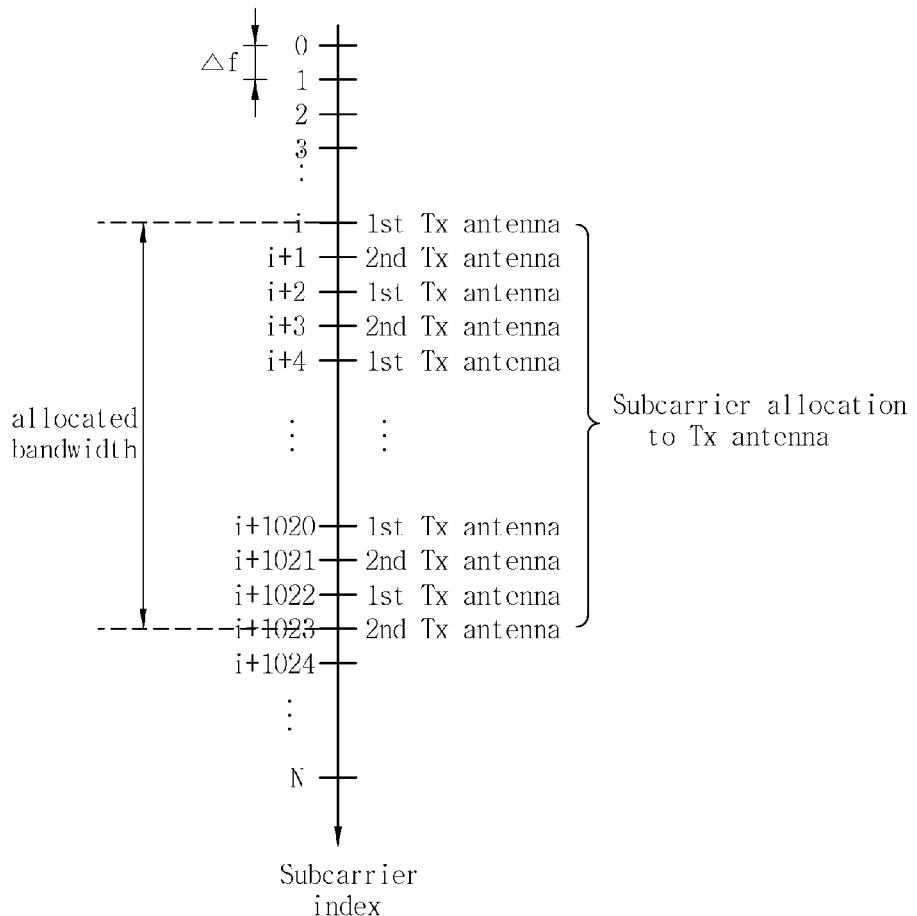
FIG. 4 shows an example in which subcarriers are allocated to each Tx antenna in an interleaved manner in an SC-FDMA system using FSTD.

FIG. 4 shows an example in which subcarriers are allocated to each Tx antenna in an interleaved manner in an SC-FDMA system using FSTD. It is assumed herein that a DFT size is 1024.

Referring to FIG. 4, an allocated bandwidth corresponds to ith to (i+1023)th subcarriers allocated in whole system bands 0 to N. A subcarrier spacing $\Delta f$ between subcarriers may be 15 kHz or 7.5 kHz. At any transmission time, different subcarriers are allocated to a 1st Tx antenna and a 2nd Tx antenna. This is because the FSTD is used. In addition, subcarriers are allocated to each Tx antenna in an interleaved manner. For example, an (i+2n)th subcarrier is allocated to the 1st Tx antenna, and an i+(2n+1)th subcarrier is allocated to the 2nd Tx antenna (where 0<n<511. That is, one subcarrier is allocated to any one Tx antenna, and one subsequent subcarrier is allocated to another Tx antenna. This is referred to as an interleaved type.

Meanwhile, to obtain a frequency diversity gain for each Tx antenna, an interleaving pattern can be changed for each SC-FDMA symbol. For example, if a 1st SC-FDMA symbol is transmitted by allocating an even-indexed subcarrier to the 1st Tx antenna and by allocating an odd-indexed subcarrier to the 2nd Tx antenna, a 2nd SC-FDMA symbol is transmitted by allocating the odd-indexed subcarrier to the 1st Tx antenna and by allocating the even-indexed subcarrier to the 2nd Tx antenna. If a resource block includes an SC-FDMA symbol to which demodulation reference signal (DMRS) is mapped, a mapping pattern can be determined by considering a position of the DMRS.

Figure 5:
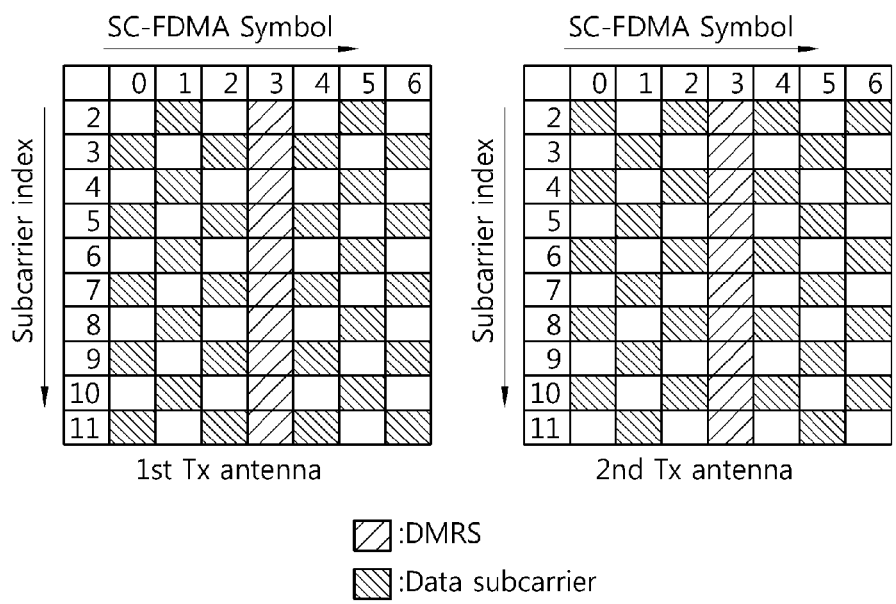
FIG. 5 shows an exemplary pattern in which the subcarriers of FIG. 4 are allocated to two Tx antennas.

FIG. 5 shows an exemplary pattern in which the subcarriers of FIG. 4 are allocated to two Tx antennas. This shows a pattern of a subcarrier index allocated to each Tx antenna over a plurality of consecutive SC-FDMA symbols (or slots or subframes). A subcarrier to which a frequency-domain symbol is mapped is hereinafter referred to as a data subcarrier.

Referring to FIG. 5, in a 0th SC-FDMA symbol, an odd-indexed subcarrier is allocated to a 1st Tx antenna, and an even-indexed subcarrier is allocated to a 2nd Tx antenna. Meanwhile, in a 1st SC-FDMA symbol, an index of an allocated subcarrier is changed. That is, an even-indexed subcarrier is allocated to the 1st Tx antenna, and an odd-indexed subcarrier is allocated to the 2nd Tx antenna. As such, when an index of a subcarrier allocated to each Tx antenna is changed for each SC-FDMA symbol, a frequency diversity gain can be obtained.

Demodulation reference signal (DMRS) for UL data modulation may be transmitted by being mapped to a specific SC-FDMA symbol (hereinafter, SC-FDMA symbol for demodulation). In this case, an index pattern of a subcarrier allocated to each Tx antenna in an SC-FDMA symbol immediately next to the SC-FDMA symbol for demodulation is the same as that in an SC-FDMA symbol immediately previous to the SC-FDMA symbol for demodulation.

Although two Tx antennas are used in the above description, it is also possible to use four Tx antennas. In this case, each subcarrier can be allocated to each Tx antenna with an interval of 4 subcarriers. In addition, in a 1st slot, each subcarrier may be allocated to 1st and 2nd Tx antennas (or 1st and 3rd Tx antennas). In a 2nd slot, each subcarrier may be allocated to 3rd and 4th Tx antennas (or 2nd and 4th Tx antennas).

Figure 6:
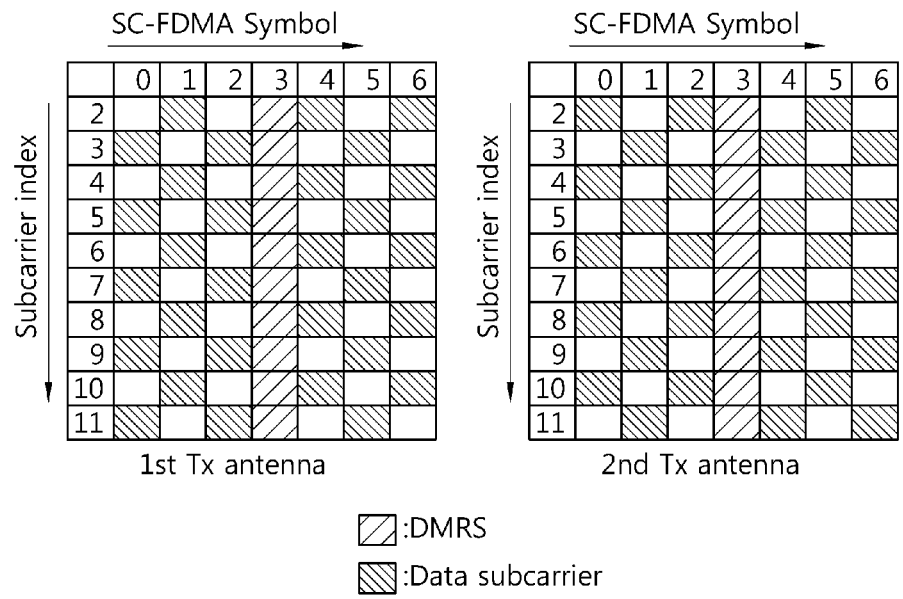
FIG. 6 shows another exemplary pattern in which the subcarriers of FIG. 4 are allocated to two Tx antennas.

FIG. 6 shows another exemplary pattern in which the subcarriers of FIG. 4 are allocated to two Tx antennas. This shows a pattern of a subcarrier index allocated to each Tx antenna over a plurality of consecutive SC-FDMA symbols (or slots or subframes).

The pattern of FIG. 6 is the same as the pattern of FIG. 4 except that a subcarrier index pattern changes at SC-FDMA symbols located immediately previous and next to an SC-FDMA symbol for demodulation. Although two Tx antennas are used herein, it is also possible to use four Tx antennas. In this case, each subcarrier can be allocated to each Tx antenna with an interval of 4 subcarriers. In addition, in a 1st slot, each subcarrier may be allocated to 1st and 2nd Tx antennas (or 1st and 3rd Tx antennas). In a 2nd slot, each subcarrier may be allocated to 3rd and 4th Tx antennas (or 2nd and 4th Tx antennas).

Figure 7:
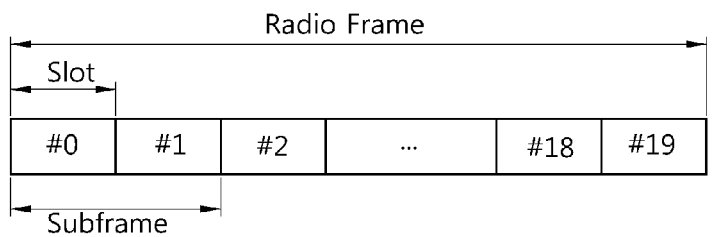
FIG. 7 shows an exemplary structure of a radio frame.

FIG. 7 shows an exemplary structure of a radio frame.

Referring to FIG. 7, the radio frame consists of 10 subframes. One subframe may include two slots. One slot may include a plurality of SC-FDMA symbols (or OFDM symbols) in a time domain and at least one subcarrier in a frequency domain. The slot may be a unit of allocating radio resources in the time domain and the frequency domain. For example, one slot can include 7 or 6 OFDM symbols.

The radio frame structure is shown for exemplary purposes only, and thus the number of subframes included in the radio frame or the number of slots included in the subframe or the number of OFDM symbols included in the slot may change variously.

Figure 8:
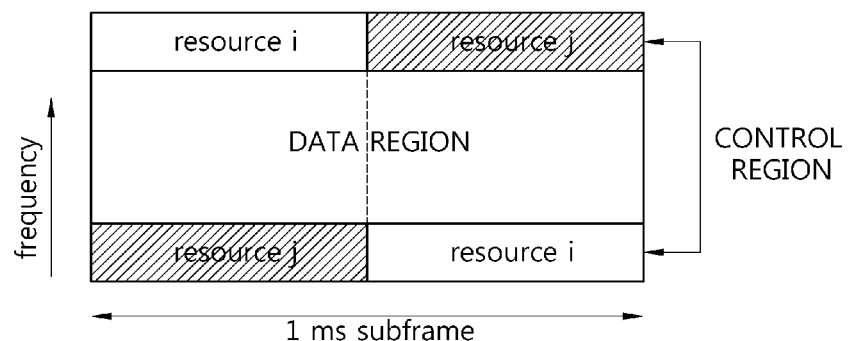
FIG. 8 shows an exemplary subframe.

FIG. 8 shows an exemplary subframe. The subframe may be a UL subframe.

Referring to FIG. 8, the subframe can be divided into two parts, i.e., a control region and a data region. The control region is used to transmit only a control signal and is assigned to a control channel. The control channel may be referred to as a physical uplink control channel (PUCCH). The data region is used to transmit data and is assigned to a data channel. The data channel may be referred to as a physical uplink shared channel (PUSCH). The control channel transmits the control signal. The data channel may transmit only user data or may transmit both the user data and the control signal. The control channel and the data channel can be configured with one subframe. The control signal includes a plurality of signals other than the user data. That is, the control signal includes an acknowledgement (ACK)/negative-acknowledgement (NACK) signal, a channel quality indicator (CQI), a precoding matrix index (PMI), a rank indicator (RI), etc.

Since the control region and the data region use different frequency bands, frequency division multiplexing (FDM) have been achieved. The control region is located at both edges of a system bandwidth. The data region is located in a center portion of the system bandwidth. However, this is for exemplary purposes only, and thus the arrangement of the control region and the data region is not limited thereto. The locations of the control region and the data region may be changed from each other, and are not limited to the pattern shown in the figure.

Figure 9:
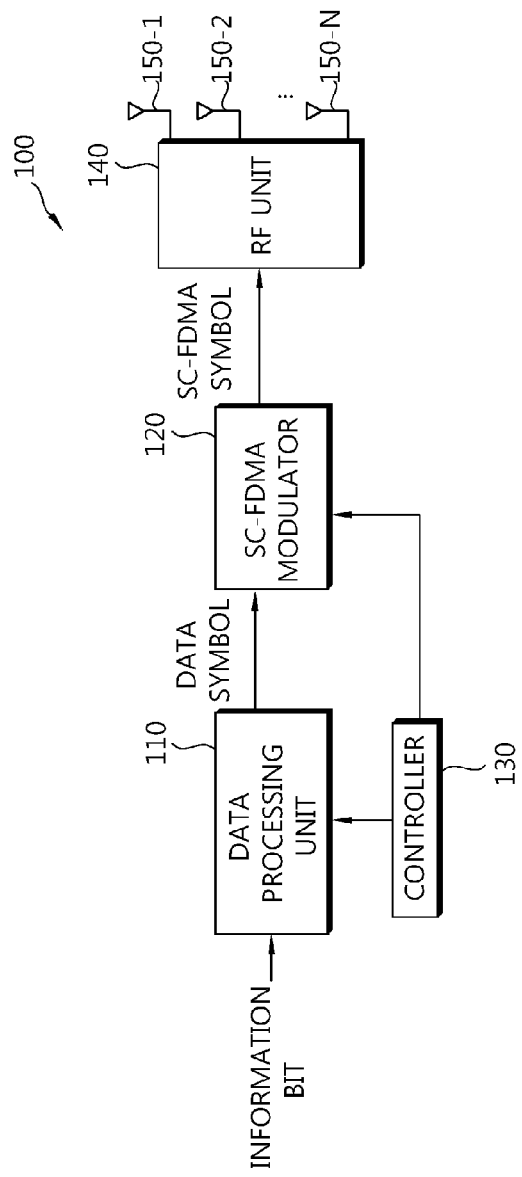
FIG. 9 is a block diagram showing a transmitter.

FIG. 9 is a block diagram showing a transmitter.

Referring to FIG. 9, a transmitter 100 includes a data processing unit 110, an SC-FDMA modulator 120, a controller 130, a radio frequency (RF) unit 140, and Tx antennas 150-1, 150-2, ..., 150-N.

The data processing unit 110 converts an input information bit into a data symbol. The data processing unit 110 performs channel coding on the information bit to generate a codeword, and performs constellation mapping on the codeword to generate a data symbol. The information bit includes user data to be transmitted to a receiver of FIG. 20. Further, the information bit may include control information in association with user data transmission or radio resource allocation.

The SC-FDMA modulator 120 performs modulation on the data symbol using an SC-FDMA modulation scheme to generate an SC-FDMA symbol. The control information may be input to the SC-FDMA modulator 120 by being modulated independently from the user data. The controller 130 controls operations of the data processing unit 110 and the SC-FDMA modulator 120. The RF unit 140 converts an input SC-FDMA symbol into an analog signal. The converted analog signal is propagated to a wireless channel through the Tx antennas 150-1, 150-2, ..., 150-N.

Figure 10:
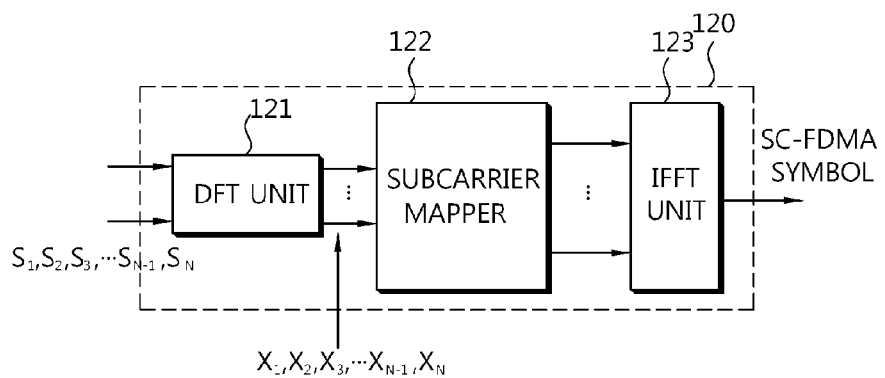
FIG. 10 is a block diagram showing an example of an SC-FDMA modulator.

FIG. 10 is a block diagram showing an example of an SC-FDMA modulator. An FSTD scheme is used in the SC-FDMA modulator.

Referring to FIG. 10, an SC-FDMA modulator 120 includes a discrete Fourier transform (DFT) unit 121 for performing DFT, a subcarrier mapper 122, and an inverse fast Fourier transform (IFFT) unit 123 for performing IFFT.

The DFT unit 121 performs DFT on an input data symbol stream $S_1, S_2, \ldots, S_{N-1}, S_N$ to output a frequency-domain symbol stream $X_1, X_2, \ldots, X_{N-1}, X_N$. The data symbol stream input to the DFT unit 121 may be control information and/or user data. The DFT size may be fixed to a size of allocated resource blocks, or may vary depending on systems.

The subcarrier mapper 122 allocates the frequency-domain symbol stream $X_1, X_2, \ldots, X_{N-1}/X_N$ to each subcarrier according to various signal formats. The subcarriers are separately allocated for each of the Tx antennas 150-1, 150-2, ..., 150-N. The subcarriers may be allocated for each Tx antenna according to interleaved allocation or localized allocation.

The IFFT unit 123 outputs time-domain SC-FDMA symbols by performing IFFT on subcarriers to which the frequency-domain symbol stream $X_1, X_2, \ldots, X_{N-1}, X_N$ is mapped. A scheme for performing modulation by combining DFT and IFFT is referred to as SC-FDMA, and is advantageous over OFDM using only IFFT in terms of decreasing a peak-to-average power ratio (PAPR). This is because the SC-FDMA has a single-carrier property.

Figure 11:
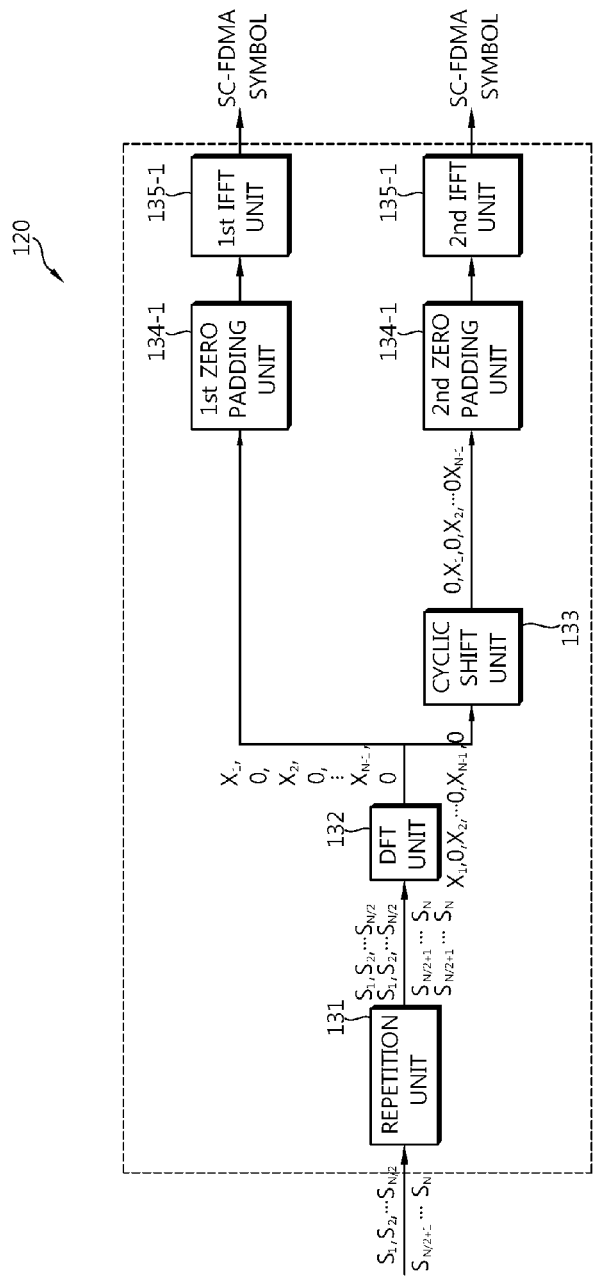
FIG. 11 is a block diagram showing another example of an SC-FDMA modulator.

FIG. 11 is a block diagram showing another example of an SC-FDMA modulator. It is assumed herein that the number of Tx antennas is 2. The FSTD scheme is used in the SC-FDMA modulator.

Referring to FIG. 11, an SC-FDMA modulator 120 includes a repetition unit 131, a discrete Fourier transform (DFT) unit 132 for performing DFT, a cyclic shift unit 133, 1st and 2nd zero padding units 134-1 and 134-2, and 1st and 2nd inverse fast Fourier transform (IFFT) units 135-1 and 135-2 for performing IFFT.

The repetition unit 131 repeats an input data symbol stream $S_1, S_2, \ldots, S_{N/2}, S_{N/2+1}, \ldots, S_N$ to output a symbol stream $S_1, S_2, \ldots, S_{N/2}, S_1, S_2, \ldots, S_{N/2}, S_{N/2+1}, \ldots, S_N, S_{N/2+1}, \ldots, S_N$.

The DFT unit 132 performs DFT on the input repetition symbol stream $(S_1, S_2, \ldots, S_{N/2}, S_1, S_2, \ldots, S_{N/2})$, $(S_{N/2+1}, \ldots, S_N, S_{N/2+1}, \ldots, S_N)$ to output a frequency-domain symbol stream $(X_1, 0, X_2, 0, \ldots, X_{N/2-1}, 0), (X_{N/2+1}, 0, \ldots, X_N, 0)$. Herein, a DFT size is fixed to a size of allocated resource blocks. If a repeated time-domain signal is subjected to DFT spreading, zeros periodically appear in a frequency domain. That is, when DFT is performed after repeating a data symbol stream, an automatically interleaved frequency-domain symbol stream is obtained. For example, when N-sized DFT spreading is performed on the repeated signals $S_1, S_2, \ldots, S_{N/2}, S_1, S_2, \ldots, S_{N/2}$, then signals $X_1, 0, X_2, 0, \ldots, X_{N/2}, 0$ are generated.

The cyclic shift unit 133 cyclically shifts the input frequency-domain symbol stream $X_1, 0, X_2, 0, \ldots, X_{N/2-1}, 0, X_{N/2}, 0$ by k sample(s) to output a cyclically shifted frequency-domain symbol stream. If the input frequency-domain symbols stream is cyclically shifted by 1 sample, then output frequency-domain symbol stream is $0, X_1, 0, X_2, \ldots, 0, X_{N/2-1}, 0, X_{N/2}$. Therefore, an output of the DFT unit 132 and an output of the cyclic shift unit 133 can be interleaved without overlapping and then be mapped to subcarriers. For example, if outputs $X_1, 0, X_2, 0, \ldots, X_{N/2-1}, 0, X_{N/2}, 0$ of the DFT unit 132 are mapped to odd-indexed subcarriers, then outputs $0, X_{N/2+1}, 0, X_{N/2+2}, \ldots, 0, X_{N-1}, 0, X_N$ of the cyclic shift unit 133 are mapped to even-indexed subcarriers. Accordingly, when the odd-indexed subcarriers are allocated to the 1st Tx antenna, and the even-indexed subcarriers are allocated to the 2nd Tx antenna, then transmission can be naturally performed using FSTD.

The cyclic shift unit 133 linearly increases and shifts phase of a signal in time domain, it is equivalent to phase shift of the output signal. In other words, when every symbol is multiplied by a phase value $e^{j2\pi nk/N}$ in time domain, an equivalent effect can be obtained that frequency-domain symbol stream is cyclically shifted by k samples. Here, N is DFT size, $n=0, \ldots, N-1$. For instance, output signal is 1 sample shifted in frequency domain when k=1.

According to the linear phase shift, with only 1 DFT operation, interleaving effect can be obtained for signals mapped to each of Tx antennas. For example, in FSTD transmission with 2 Tx antennas and interleaved type, the following methods are available.

In an embodiment, signal can be mapped simply by being repeated. In this case, the mapped signal is $Sx=(S_1, S_2, \ldots, S_{N/2}, S_1, S_2, \ldots, S_{N/2})$, $Sy=(S_{N/2+1}, S_{N/2+2}, \ldots, S_N, S_{N/2+1}, S_{N/2+2}, \ldots, S_N)$. Sx is mapped to 1st Tx antenna and Sy is mapped to 2nd Tx antenna. By the way, the signal power of repeated symbol stream needs to be adjusted in consideration of the number of repetition. That is, the amplitude of a signal is normalized by the number of repetition. This is performed by reducing the power by inverse proportion N for the N times repeated signal. For instance, for 2 times repeated signal, the amplitude of the 2 times repeated signal (is reduced by ½. So the normalized signal should be $(S_1, S_2, \ldots, S_{N/2}, S_1, S_2, \ldots, S_{N/2})/2, S_{N/2+1}, S_{N/2+2}, \ldots, S_N, S_{N/2+1}, S_{N/2+2}, \ldots, S_N)/2$.

In another embodiment, phase shifted signal can be mapped. In this case, the mapped signal is $Sx=(S_1, S_2, \ldots, S_{N/2}, S_1, S_2, \ldots, S_{N/2})*e^{j2\pi n0/N}$, $Sy=(S_{N/2+1}, S_{N/2+2}, \ldots, S_N, S_{N/2+1}, S_{N/2+2}, \ldots, S_N)*e^{j2\pi n1/N}$. Sx is mapped to a 1st Tx antenna and Sy is mapped to a 2nd Tx antenna.

In yet another embodiment, phase shifted signals can be added with each other and mapped. In this case, the mapped signal is Sx+Sy.

In another embodiment, DFT performed signal can be mapped. In this case, the mapped signal S is $X_1, X_{N/2+1}, X_2, X_{N/2+2}, \ldots, X_{N/2-1}, X_{N-1}, X_{N/2}, X_N$.

In another embodiment, each of the symbols is mapped to each of Tx antennas in interleave type. For example, $X_1, 0, X_2, 0, \ldots, X_{N/2-1}, 0, X_{N/2}, 0$ is mapped to a 1st Tx antenna. And in a similar way, $0, X_{N/2+1}, 0, X_{N/2+2}, \ldots, 0, X_{N-1}, 0, X_N$ is mapped to a 2nd Tx antenna The 1st and 2nd zero padding units 134-1 and 134-2 reduce noise by performing oversampling through zero padding on a DFT-spread frequency-domain symbol stream.

The 1st IFFT unit 135-1 outputs an SC-FDMA symbol by performing IFFT on an output of the 1st padding unit 134-1. The 2nd IFFT unit 135-2 outputs an SC-FDMA symbol by performing IFFT on an output of the 2nd padding unit 134-2.

Without the use of an additional device for mapping DFT-spread symbol streams within contiguous resource blocks according to interleaved allocation, transmit diversity can be implemented using the FSTD scheme in the SC-FDMA system.

Figure 12:
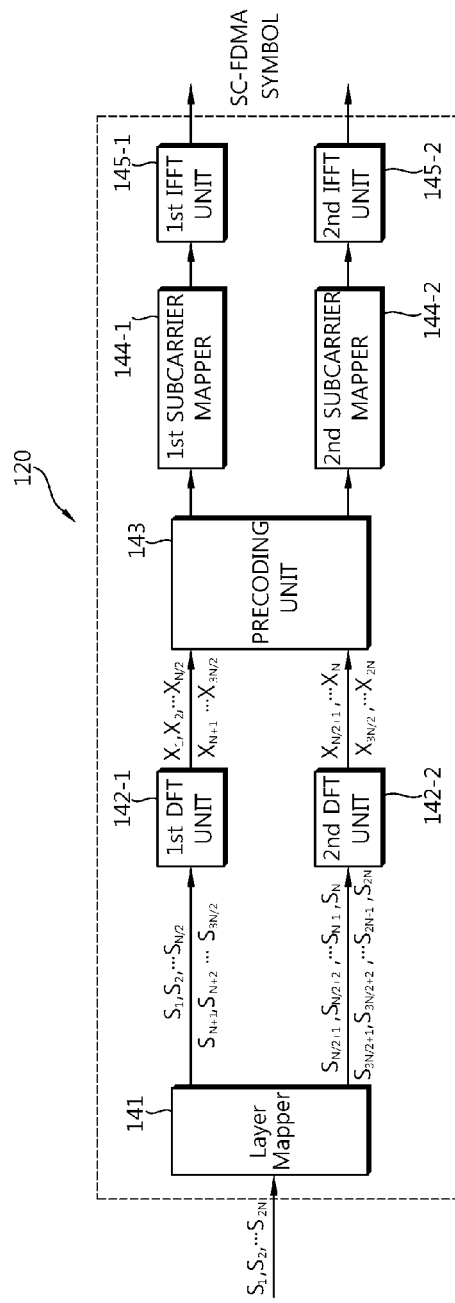
FIG. 12 is a block diagram showing another example of an SC-FDMA modulator.

FIG. 12 is a block diagram showing another example of an SC-FDMA modulator.

Referring to FIG. 12, an SC-FDMA modulator 120 includes a layer mapper 141, 1st and 2nd DFT units 142-1 and 142-2, a precoding unit 143, 1st and 2nd subcarrier mappers 144-1 and 144-2, and 1st and 2nd IFFT units 145-1 and 145-2.

The layer mapper 141 maps an input data symbol stream $S_1, S_2, \ldots, S_N, S_{N+1}, \ldots, S_{2N}$ to each of layers according to a virtual antenna or a Tx antenna. Herein, the data symbol stream is divided into a 1st data symbol stream $S_1, S_2, \ldots, S_{N/2}$, a 2nd data symbol stream $S_{N/2+1}, S_{N/2+2}, \ldots, S_N$, a 3rd data symbol stream $S_{N+1}, S_{N+2}, \ldots, S_{3N/2}$, and a 4th data symbol stream $S_{3N/2+1}, S_{3N/2+2}, \ldots, S_{2N}$.

The 1st DFT unit 142-1 performs DFT spreading on the 1st data symbol stream $S_1, S_2, \ldots, S_{N/2}$ to output a 1st frequency-domain symbol stream $X_1, X_2, \ldots, X_{N/2}$. The 2nd DFT unit 142-2 performs DFT spreading on the 2nd data symbol stream $S_{N/2+1}, S_{N/2+2}, \ldots, S_N$ to output a 2nd frequency-domain symbol stream $X_{N/2+1}, X_{N/2+2}, \ldots, X_N$. The 1st and 2nd frequency-domain symbol streams are data symbols to be mapped to 1st SC-FDMA symbols.

The 1st DFT unit 142-1 performs DFT spreading on the 3rd data symbol stream $S_{N+1}, S_{N+2}, \ldots, S_{3N/2}$ to output a 3rd frequency-domain symbol stream $X_{N+1}, X_{N+2}, \ldots, X_{3N/2}$. The 2nd DFT unit 142-2 performs DFT spreading on the 4th data symbol stream $S_{3N/2+1}, S_{3N/2+2}, \ldots, S_{2N}$ to output a 4th frequency-domain symbol stream $X_{3N/2+1}, X_{3N/2+2}, \ldots, X_{2N}$. The 3rd and 4th frequency-domain symbol streams are data symbols to be mapped to 2nd SC-FDMA symbols.

Herein, a DFT size of each of the 1st and 2nd DFT units 142-1 and 142-2 is less than an allocated frequency band (or a resource block size). That is, the DFT size is N/2. The number of DFT units may be increased and the DFT size of each DFT unit may be decreased so that an overall computational amount is decreased. The FSTD as described above can be used by considering an SC-FDMA system of which DFT size is variable depending on the number of Tx antennas. When considering subcarriers allocated to the Tx antennas, the DFT size can be determined by the following equation.

MathFigure 1

$$N_{DFT} = N_{SC}^{RB} N_{RB} / N_T \quad [\text{Math.1}]$$

Herein, $N_{DFT}$ denotes a DFT size, $N^{RB}{}_{sc}$ denotes the number of subcarriers included in one resource block, $N_{RB}$ denotes the number of allocated resource blocks, and $N_T$ denotes the number of Tx antennas. For example, in order for a system having two Tx antennas to use the FSTD, there is a need to use a frequency resource identified for each Tx antenna. When it is considered that the same resource is allocated to the two Tx antennas, $N^{RB}{}_{SC} N_{RB}/2$ frequency resources can be allocated to each Tx antenna. In this case, a DFT size for each Tx antenna is $N_{DFT} = N^{RB}{}_{SC} N_{RB}/2$. When using the FSTD in a system having four Tx antennas, it can be considered that $N_T$ is 4.

If the SC-FDMA system has two or more Tx antennas, the FSTD can be combined with any one of STBC, SFBC, CDD, and PVS. In this case, $N_T$ may be set to a value different from an actual number of Tx antennas. For example, when four Tx antennas are present, $N_T$ can be set to 2 if two arbitrary Tx antennas are paired for any one of the STBC, SFBC, CDD, and PVS.

The precoding unit 143 multiplies 1st to 4th frequency-domain symbol streams by a weight matrix. The weight matrix can also be referred to as a precoding matrix. The weight matrix may be known to both a transmitter and a receiver, or may be reported by information fed back from the receiver.

If the weight matrix is $$\begin{bmatrix} 1 & 0 \\ 0 & 1 \end{bmatrix},$$

the 1st and 2nd frequency-domain symbol streams are input to the 1st subcarrier mapper 144-1, and the 3rd and 4th frequency-domain symbol streams are input to the 2nd subcarrier mapper 144-2.

The 1st and 2nd subcarrier mappers 144-1 and 144-2 map the input frequency-domain symbols respectively to allocated subcarriers. A subcarrier on which frequency-domain symbols are mapped is referred to as a data subcarrier.

The 1st and 2nd IFFT units 145-1 and 145-2 perform IFFT on the input data subcarriers to output SC-FDMA symbols.

Figure 13:
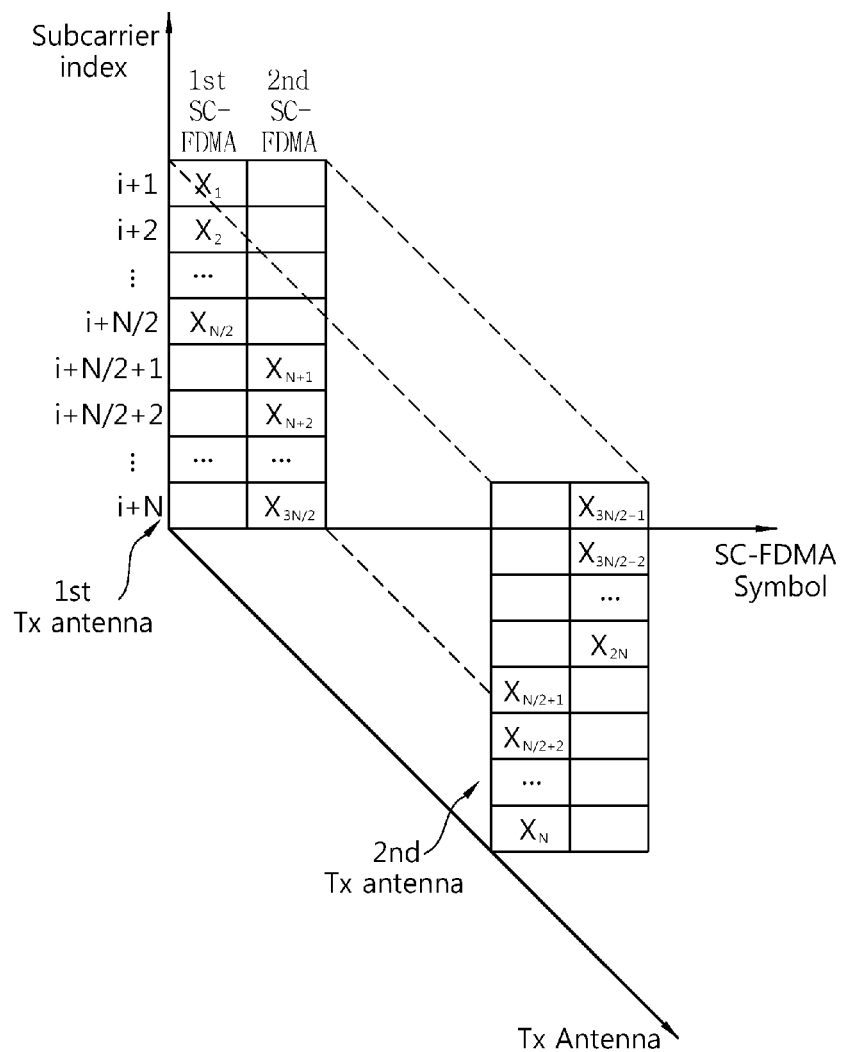
FIG. 13 shows an example of allocating subcarriers to each Tx antenna by the SC-FDMA modulator of FIG. 12.

FIG. 13 shows an example of allocating subcarriers to each Tx antenna by the SC-FDMA modulator of FIG. 12. Herein, frequency-domain symbols are mapped to subcarriers according to localized allocation.

Referring to FIG. 13, in a 1st SC-FDMA symbol, the 1st subcarrier mapper 144-1 maps a 1st frequency-domain symbol stream $X_1, X_2, \ldots, X_{N/2}$ in a localized manner to subcarriers with upper indices i+1 to i+N/2 allocated to a 1st Tx antenna. In addition, in the 1st SC-FDMA symbol, the 2nd subcarrier mapper 144-2 maps a 2nd frequency-domain symbol stream $X_{N/2+1}, X_{N/2+2}, \ldots, X_N$ in a localized manner to subcarriers with lower indices i+(N/2+1) to i+N allocated to a 2nd Tx antenna.

Meanwhile, in a 2nd SC-FDMA symbol, the 1st subcarrier mapper 144-1 maps a 3rd frequency-domain symbol stream $X_{N+1}, X_{N+2}, \ldots, X_{3N/2}$ in a localized manner to subcarriers with lower indices i+(N/2+1) to i+N allocated to the 1st Tx antenna. In addition, in the 2nd SC-FDMA symbol, the second subcarrier mapper 144-2 maps a 4th frequency-domain symbol stream $X_{3N/2+1}, X_{3N/2+2}, \ldots, X_{2N}$ in a localized manner to subcarriers with upper indices i+1 to i+N/2 allocated to the 2nd Tx antenna. As such, when subcarriers are allocated to each Tx antenna in a localized manned, the SC-FDMA system using the FSTD can maintain its single-carrier property.

A frequency diversity gain can be achieved by exchanging subcarrier indices allocated to each Tx antenna for each SC-FDMA symbol. For example, subcarriers with i+1 to i+N/2 can be allocated to the 1st Tx antenna in the 1st SC-FDMA symbol, and subcarriers with i+(N/2+1) to i+N can be allocated to the 1st Tx antenna in the 2nd SC-FDMA symbol.

Figure 14:
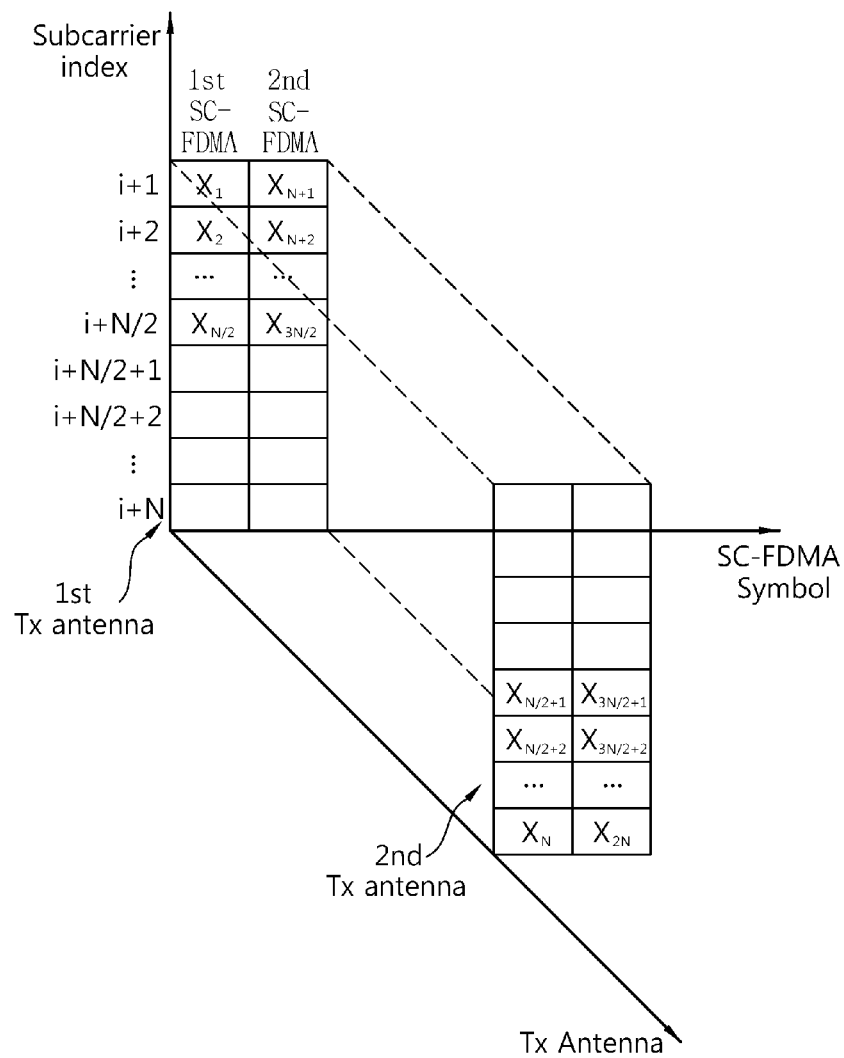
FIG. 14 shows another example of allocating subcarriers to each Tx antenna by the SC-FDMA modulator of FIG. 12.

FIG. 14 shows another example of allocating subcarriers to each Tx antenna by the SC-FDMA modulator of FIG. 12. Herein, frequency-domain symbols are mapped to subcarriers according to localized allocation.

Referring to FIG. 13, unlike in FIG. 14, subcarriers with i+1 to i+N/2 are allocated only to a 1st Tx antenna, and subcarriers with i+(N/2+1) to i+N are allocated only to a 2nd Tx antenna. Subcarriers allocated to a specific Tx antenna in a localized manner are not allocated to another Tx antenna as time elapses. That is, hopping is not made when subcarriers are allocated to each Tx antenna.

Figure 15:
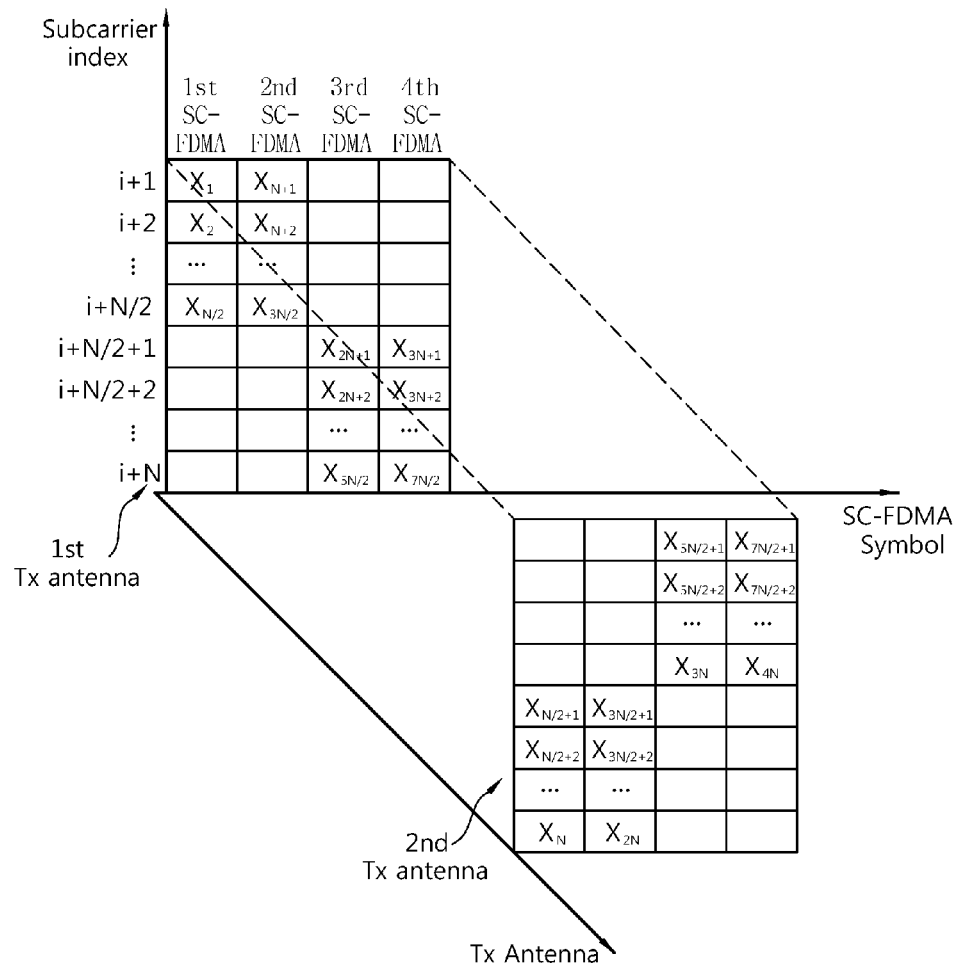
FIG. 15 shows another example of allocating subcarriers to each Tx antenna by the SC-FDMA modulator of FIG. 12.

FIG. 15 shows another example of allocating subcarriers to each Tx antenna by the SC-FDMA modulator of FIG. 12. Herein, frequency-domain symbols are mapped to subcarriers according to localized allocation.

Referring to FIG. 15, during a specific number of SC-FDMA symbol durations (e.g., 2 SC-FDMA symbol durations), subcarriers with i+1 to i+N/2 are allocated only to a 1st Tx antenna, and subcarriers with i+(N/2+1) to i+N are allocated only to a 2nd Tx antenna. During a specific number of SC-FDMA symbol durations subsequent to the above SC-FDMA symbol durations, subcarriers with i+1 to i+N/2 are allocated only to the 2nd Tx antenna, and subcarriers with i+(N/2+1) to i+N are allocated only to the 1st Tx antenna. That is, subcarriers to be allocated in a localized manner are allocated to one Tx antenna and then are allocated to another Tx antenna after a specific time elapses.

Figure 16:
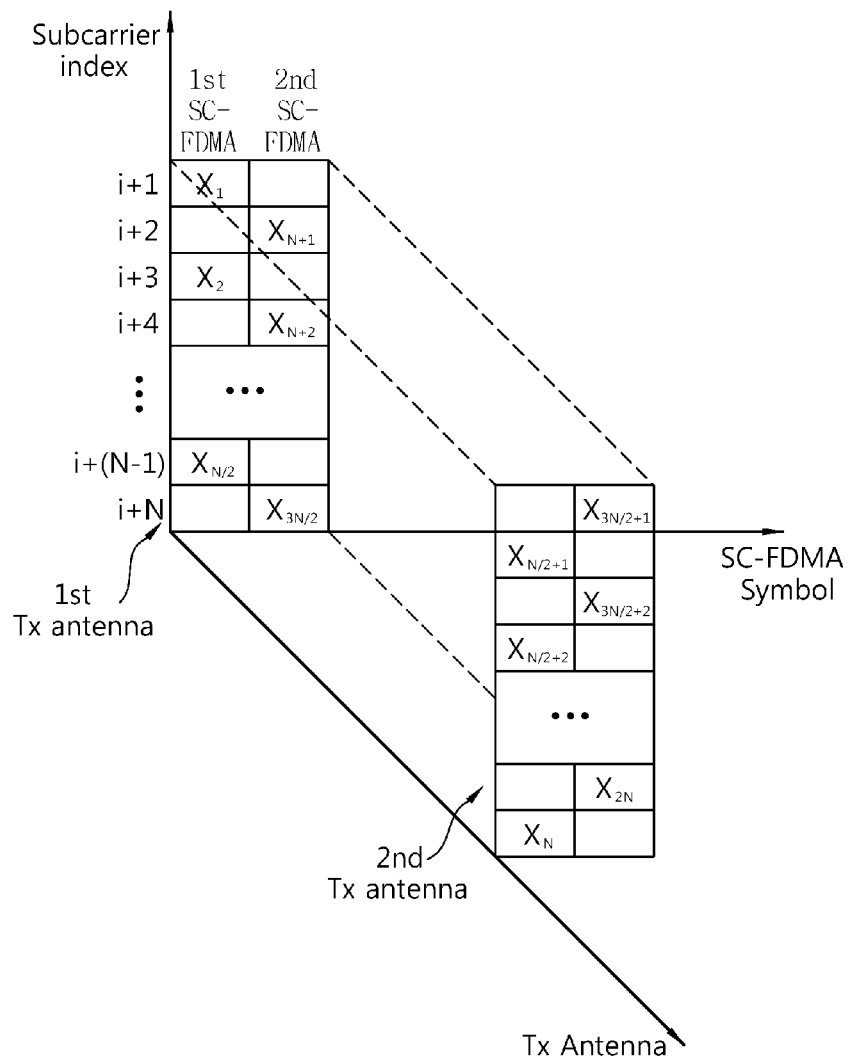
FIG. 16 shows another example of allocating subcarriers to each Tx antenna by the SC-FDMA modulator of FIG. 12.

FIG. 16 shows another example of allocating subcarriers to each Tx antenna by the SC-FDMA modulator of FIG. 12. Herein, frequency-domain symbols are mapped to subcarriers according to interleaved allocation.

Referring to FIG. 16, in a 1st SC-FDMA symbol, the 1st subcarrier mapper 144-1 maps a 1st frequency-domain symbol stream $X_1, X_2, \ldots, X_{N/2}$ to subcarriers with odd indices i+1 to i+N/2 allocated to a 1st Tx antenna. In addition, in the 1st SC-FDMA symbol, the 2nd subcarrier mapper 144-2 maps a 2nd frequency-domain symbol stream $X_{N/2+1}, X_{N/2+2}, \ldots, X_N$ to subcarriers with even indices i+2, i+4, \ldots, i+N. Herein, mapping is performed according to interleaved allocation.

Meanwhile, in a 2nd SC-FDMA symbol, indices of subcarriers allocated to the 1st Tx antenna are switched with indices of subcarriers allocated to the 2nd Tx antenna. That is, subcarriers with even indices i+2, i+4, \ldots, i+N are allocated to the 1st Tx antenna and subcarriers with odd indices i+1, i+3, \ldots i+(N−1) are allocated to the 2nd Tx antenna in an interleaved manner. Accordingly, a frequency diversity gain can be obtained.

Figure 17:
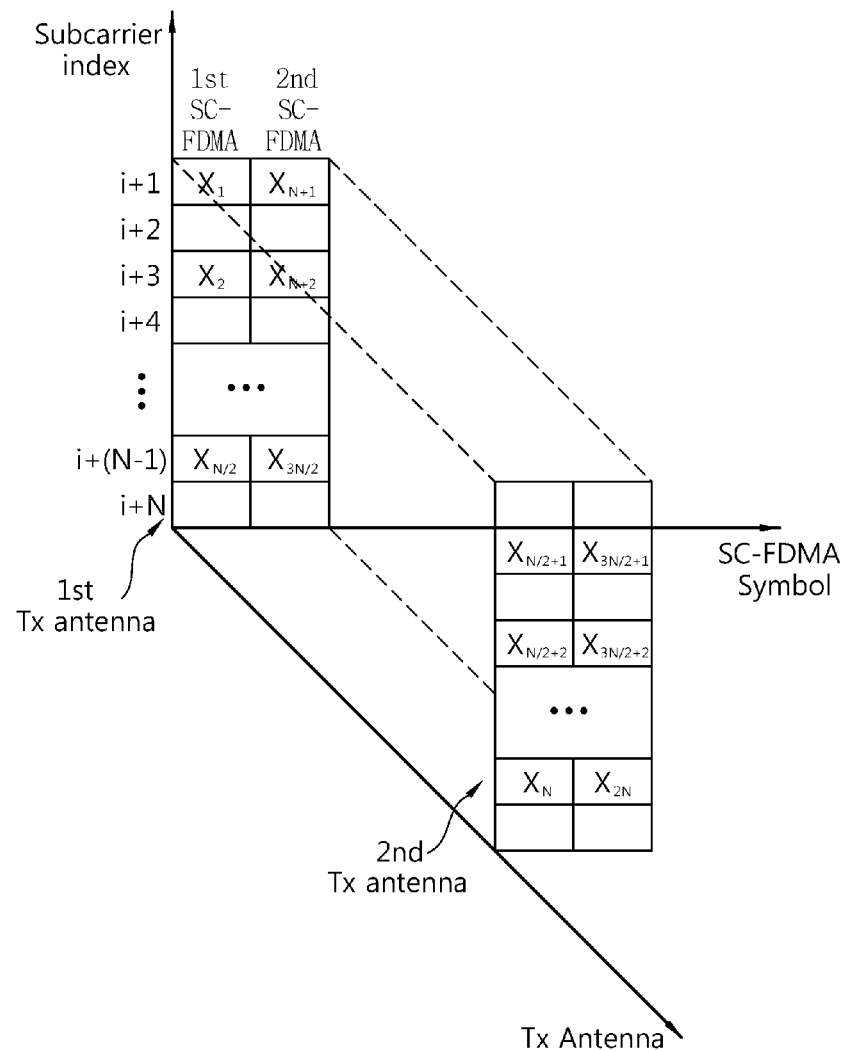
FIG. 17 shows another example of allocating subcarriers to each Tx antenna by the SC-FDMA modulator of FIG. 12.

FIG. 17 shows another example of allocating subcarriers to each Tx antenna by the SC-FDMA modulator of FIG. 12. Herein, frequency-domain symbols are mapped to subcarriers according to interleaved allocation.

Referring to FIG. 17, unlink in FIG. 15, subcarriers with odd indices i+1, i+3, ... i+(N−1) are allocated only to a 1st Tx antenna, and subcarriers with even indices i+2, i+4, ... , i+N are allocated only to a 2nd Tx antenna. Subcarriers allocated to a specific Tx antenna in an interleaved manner are not allocated to another Tx antenna as time elapses. That is, hopping is not made when subcarriers are allocated to each Tx antenna.

Figure 18:
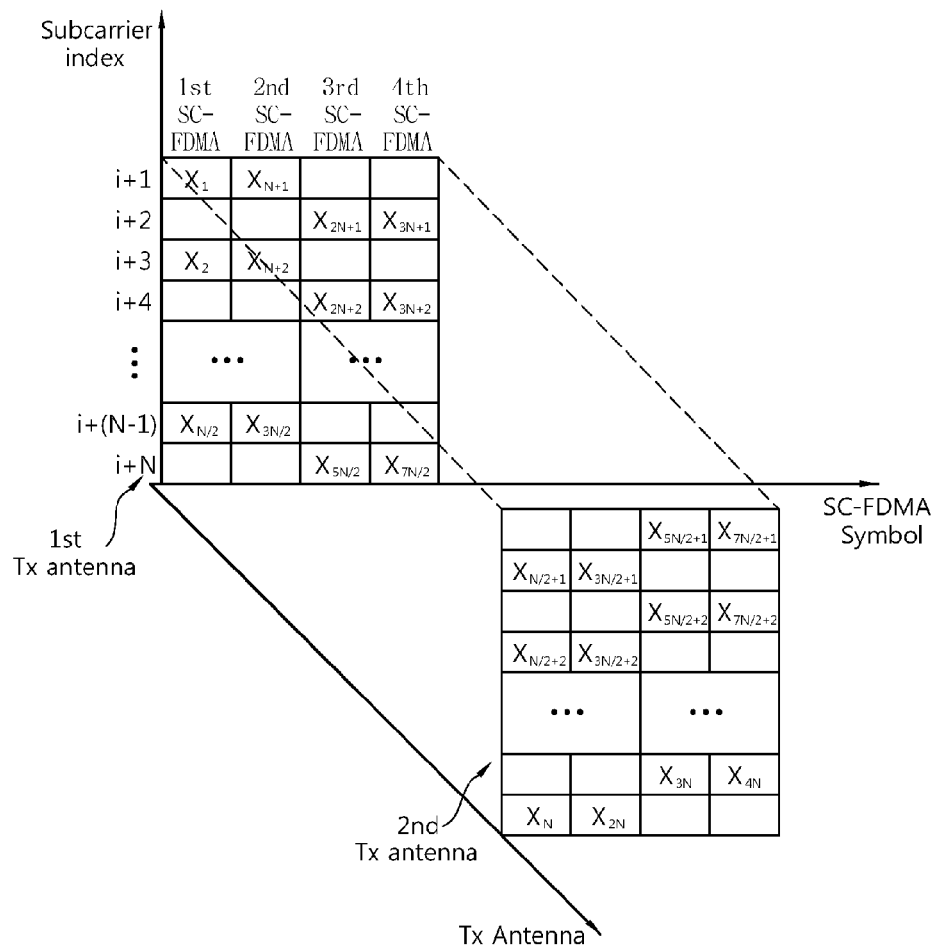
FIG. 18 shows another example of allocating subcarriers to each Tx antenna by the SC-FDMA modulator of FIG. 12.

FIG. 18 shows another example of allocating subcarriers to each Tx antenna by the SC-FDMA modulator of FIG. 12. Herein, frequency-domain symbols are mapped to subcarriers according to interleaved allocation.

Referring to FIG. 18, during a specific number of SC-FDMA symbol durations (e.g., 2 SC-FDMA symbol durations), subcarriers with odd indices i+1, i+3, ... i+(N−1) are allocated to a 1st Tx antenna, and subcarriers with even indices i+2, i+4, ... , i+N are allocated to a 2nd Tx antenna. During a specific number of SC-FDMA symbol durations subsequent to the above SC-FDMA symbol durations, the subcarriers with odd indices i+1, i+3, ... i+(N−1) are allocated to the 2nd Tx antenna, and subcarriers with even indices i+2, i+4, ... , i+N are allocated to the 1st Tx antenna. That is, subcarriers are allocated to one Tx antenna in an interleaved manner and then are allocated to another Tx antenna in an interleaved manner after a specific time elapses.

Figure 19:
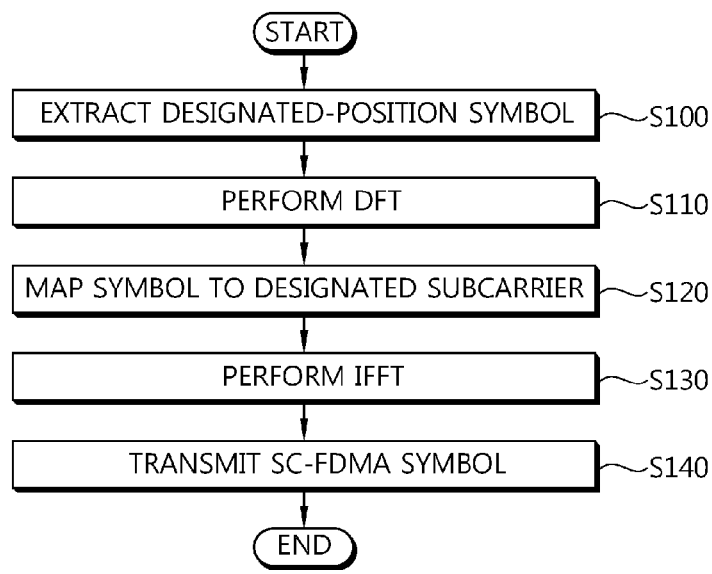
FIG. 19 is a flowchart showing an exemplary method of transmitting a data symbol.

FIG. 19 is a flowchart showing an exemplary method of transmitting a data symbol. The data symbol is referred hereinafter as a modulated symbol to which control information or user data is constellation-mapped. Examples of the control information include channel quality information (CQI), a rank indicator (RI), acknowledgement (ACK)/negative acknowledgment (NACK), a precoding matrix indicator (PMI), etc. A modulated symbol to which the control information is constellation-mapped is referred to as a control symbol. A modulated symbol to which the user data is constellation-mapped is referred to a user data symbol.

Referring to FIG. 19, a designated-position symbol is extracted from a data symbol stream (step S100). The designated-position symbol is a modulated symbol which is multiplexed by being designated at a specific bit position by a channel interleaver. The designated-position symbol is subjected to modulation and DFT spreading and is then finally mapped to a subcarrier located at a designated position. The designated-position symbol may be a control symbol or a user data symbol. The designated-position symbol may be located in the data symbol stream in an interleaved manner.

DFT is performed on the extracted designated-position symbol (step S110). The remaining symbols other than the extracted designated-position symbol of the data symbol stream are subjected to DFT independently from the extracted designated-position symbol. The DFT operation can be performed by a DFT device whose size and number are variable depending on the number of Tx antennas. As a result of the DFT operation, a frequency-domain symbol is obtained, and the obtained frequency-domain symbol is mapped to a designated subcarrier (step S120). The designated subcarrier is a subcarrier designated so that a DFT-spread designated-position symbol is mapped thereon. IFFT is performed on the designated subcarrier to which the frequency-domain symbol is mapped (step S130). As a result of the IFFT operation, a time-domain SC-FDMA symbol is generated, and the obtained SC-FDMA symbol is transmitted (step S140).

When a data symbol stream is simply divided by a determined DFT size and DFT is performed on the divided data symbol stream, there is a problem in that a position of a subcarrier to which the designated-position symbol is to be mapped is changed. Therefore, when DFT is performed on the data symbol stream according to interleaved allocation, it is preferable that designated-position symbols and designated subcarriers are predetermined, and the designated-position symbols are gathered to be subjected to DFT independently from other data symbols and then are mapped to respective designated subcarriers according to interleaved allocation.

Figure 20:
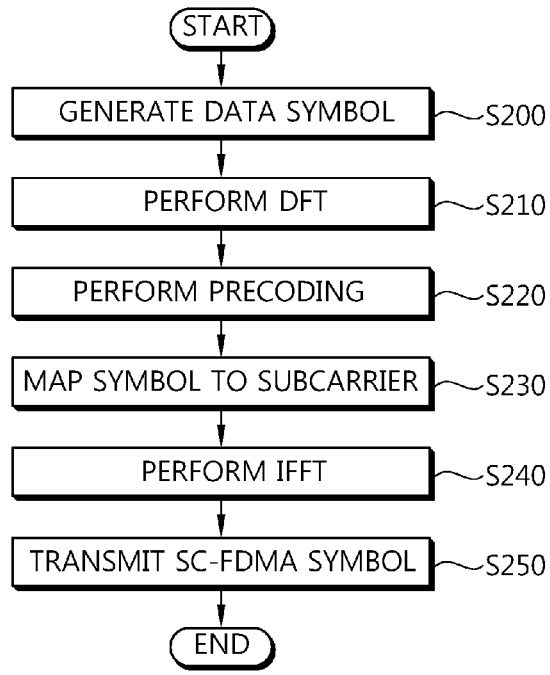
FIG. 20 is a flowchart showing a method of data transmission using transmit diversity in a wireless communication system.

FIG. 20 is a flowchart showing a method of data transmission using transmit diversity in a wireless communication system.

Referring to FIG. 20, a data symbol stream is generated by performing constellation mapping on information bits (step S200). The data symbol stream may be repetition of the same information bit. DFT is performed on the data symbol stream (step S210). For one example, DFT may be performed on the data symbol stream by one DFT device. For another example, DFT may be simultaneously performed on the data symbol stream by a plurality of separate DFT devices. In this case, the number of DFT devices may depend on the number of Tx antennas. For example, if the number of Tx antennas is 2, DFT may be performed by a DFT device having a DFT size corresponding to a half of an allocated frequency band. The data symbol stream is converted into a frequency-domain symbol by the DFT operation.

Precoding is performed on the frequency-domain symbol (step S220). Herein, the precoding implies a process of multiplying the frequency-domain symbol by a precoding matrix. The precoding may be combination of weight vectors in consideration of a channel condition. The weight vector is a vector for determining a specific weight with which a signal is transmitted to each virtual antenna (or actual Tx antenna).

The precoded frequency-domain symbol is mapped to a subcarrier (step S230). Herein, the precoded frequency-domain symbol may be mapped to the subcarrier according to interleaved allocation or localized allocation. A subcarrier to which the precoded frequency-domain symbol is mapped is referred to as a data subcarrier.

IFFT is performed on the data subcarrier (step S240). As a result of the IFFT operation, a Tx symbol is generated. Herein, the Tx symbol may be any one of an SC-FDMA symbol and a clustered DFT-spread-OFDM (DFT-S-OFDM) symbol. If the Tx symbol is the SC-FDMA symbol, the precoded frequency-domain symbol is allocated (or mapped) to consecutive subcarriers or equally-spaced subcarriers. If the Tx symbol is the clustered DFT-S-OFDM symbol, M(<N) symbol streams among N frequency-domain precoded symbols are allocated (or mapped) to consecutive subcarriers, and the remaining N-M symbol streams are allocated (or mapped) to consecutive subcarriers spaced apart by a specific interval from a subcarrier on which the M symbol streams are allocated (or mapped). The generated SC-FDMA symbol or clustered DFT-S-OFDM symbol is transmitted (step S250).

Figure 21:
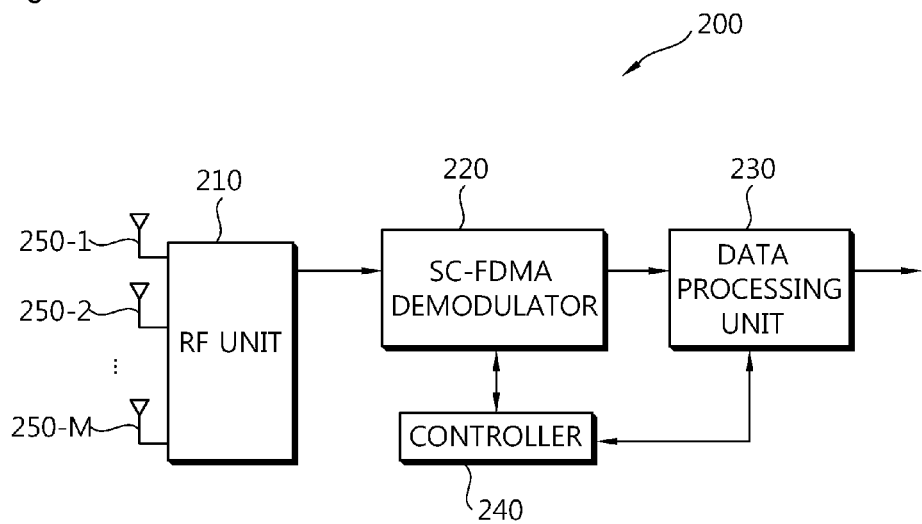
FIG. 21 is a block diagram of a receiver.

FIG. 21 is a block diagram of a receiver.

Referring to FIG. 21, the receiver 200 includes an RF unit 210, an SC-FDMA demodulator 220, a data processing unit 230, and a controller 240.

The RF unit 210 converts a signal received through an Rx antenna into a digital signal. The SC-FDMA demodulator 220 performs a counterpart operation of the modulation of the SC-FDMA modulator 120 on the digital signal to output a data symbol. The data processing unit 230 recovers an information bit from the data symbol. The controller 240 controls operations of the SC-FDMA demodulator 220 and the data processing unit 230.

The aforementioned methods of allowing the SC-FDMA system to use the FSTD can also equally apply to a case where resource blocks are allocated in a hybrid type. That is, when the allocated resource blocks (herein, the resource blocks may be arranged on a frequency-axis in a localized manner or may be arranged spaced apart from one another) are divided in a frequency division manner, frequency resources can be allocated to each Tx antenna by being identified according to interleaved allocation or localized allocation within the allocated resource blocks.

The invention claimed is:

1. A method for data transmission in a wireless communication system with multiple transmit antennas, the method comprising: repetitively generating a data symbol stream by performing constellation mapping on a codeword; generating a frequency-domain symbol by performing discrete Fourier transform (DFT) on the repetitively generated data symbol stream wherein a size of DFT performed on the repetitively generated data symbol stream varies depending on the number of the multiple transmit antennas, and wherein a power amplitude of the repetitively generated data symbol stream is inversely proportional to a number of repetition of the generation of the data symbol; mapping the frequency-domain symbol to subcarriers separately allocated for each of the multiple transmit antennas; generating a transmit symbol by performing inverse fast Fourier transform (IFFT) on the subcarriers to which the frequency-domain symbol is mapped, wherein the transmit symbol is a single carrier-frequency division multiple access (SC-FDMA) symbol or a clustered DFT-spread-orthogonal frequency division multiple access (DFT-S-OFDM) symbol, wherein if the transmit symbol is the SC-FDMA symbol, the frequency-domain symbol is allocated to consecutive subcarriers or equally-spaced subcarriers, wherein if the transmit symbol is the clustered DFT-S-OFDM symbol, a certain portion of symbol streams among the frequency-domain symbol are allocated to consecutive subcarriers and a remaining portion of symbol streams among the frequency-domain symbol are allocated to consecutive subcarriers spaced apart by a specific frequency interval, and wherein the SC-FDMA symbol and the clustered DFT-S-OFDM symbol are used for an uplink transmission; and transmitting the transmit symbol by using the multiple transmit antennas.

2. The method of claim 1, wherein the separately allocated subcarriers are locally contiguous to one another when the frequency-domain symbol is allocated to consecutive subcarriers.

3. The method of claim 1, wherein the separately allocated subcarriers are changed for each SC-FDMA symbol.

4. The method of claim 1, wherein the separately allocated subcarriers are identical for each SC-FDMA symbol.

* * * * *